Figure 1:
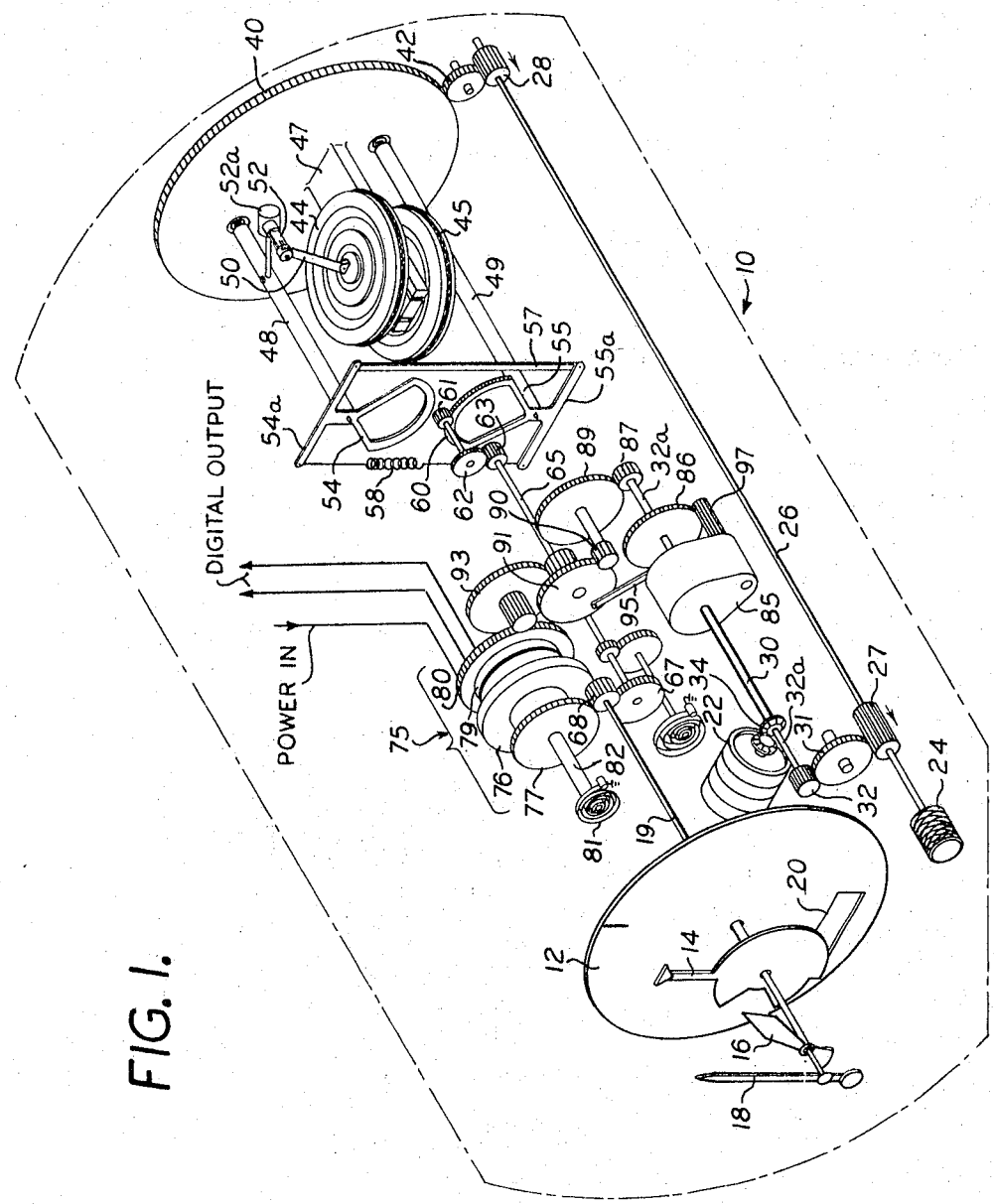

INVENTOR
FRANK G. DALEO

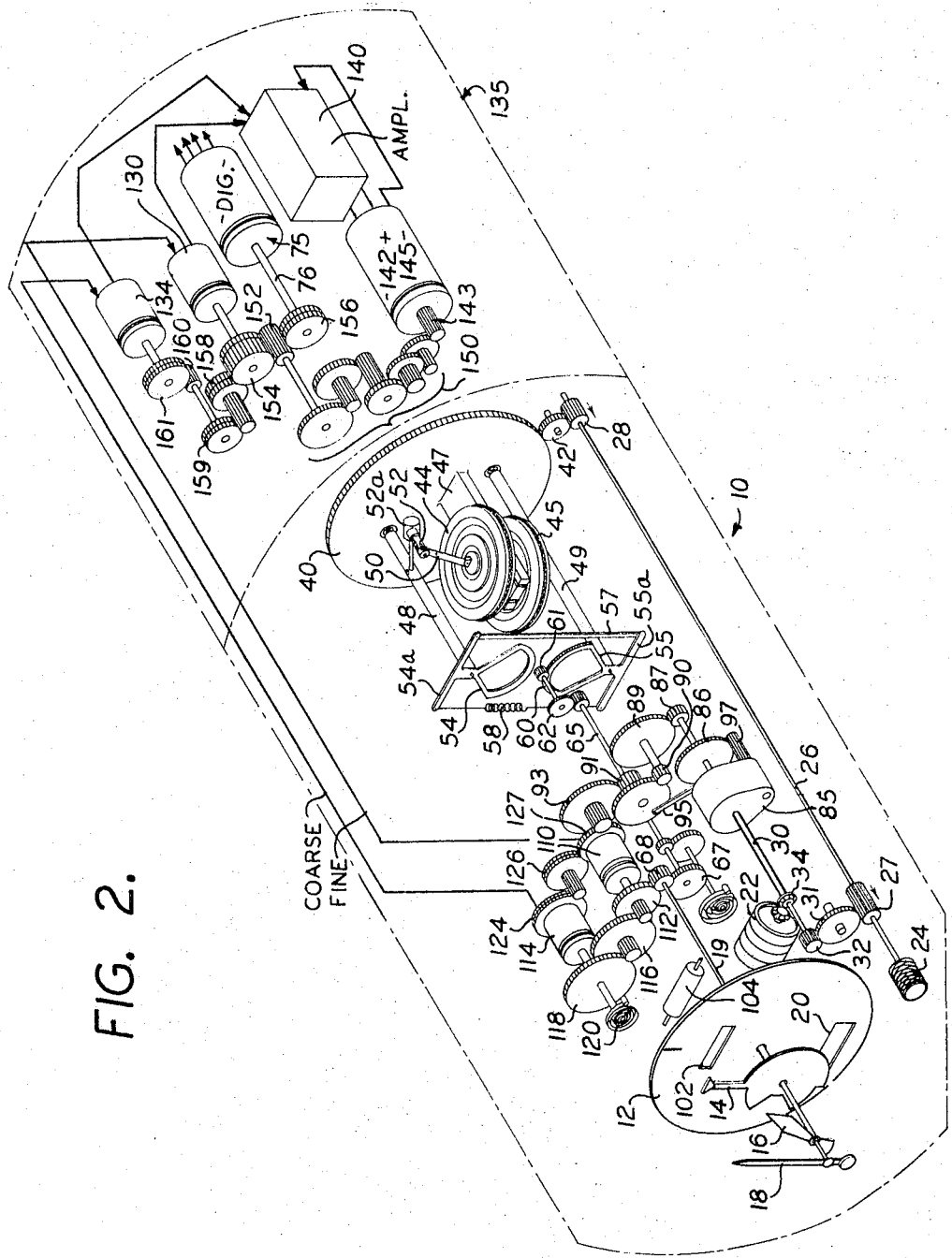

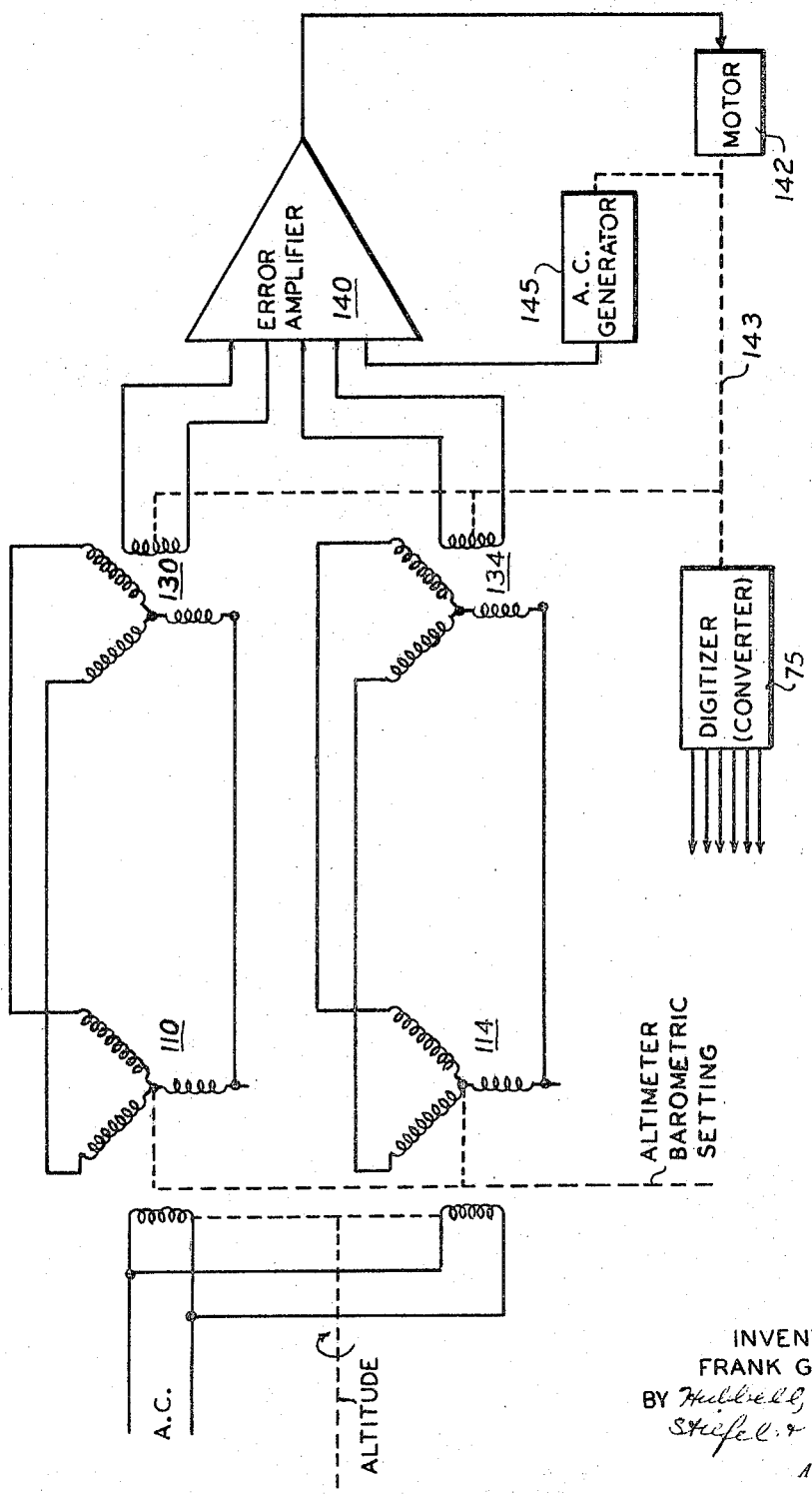

# United States Patent Office 3,353,408
Patented Nov. 21, 1967

3,353,408
ALTIMETER FOR PRODUCING DATA REFERENCED TO A PREDETERMINED PRESSURE
Frank G. Daleo, Armonk, N.Y., assignor to Astek Instrument Corp., Armonk, N.Y., a corporation of New York
Filed May 25, 1965, Ser. No. 458,641
11 Claims. (Cl. 73—387)

This invention relates to altimeters for use in aircraft and more particularly to barometric type altimeters for producing electrical output signals corresponding to a measured altitude referenced to a predetermined pressure while indicating an altitude referenced to the same predetermined pressure or to another pressure.

Substantially all barometric type altimeters for measuring altitude make use of one or more pressure sensitive elements whose dimensions change in accordance with the barometric pressure being sensed. The dimensional change of the element or elements is used to drive the pointer of some form of meter, normally calibrated in feet, which gives an indication of the altitude measured. Since the altimeter measures pressure to get altitude, the indicated altitude is actually the difference between the measured barometric pressure and some reference barometric pressure set into the altimeter.

In general, two types of altitude measurements can be made by pressure type altimeters. The first of these to be considered is the pressure altitude. This is defined as the altitude read from an altimeter when its reference pressure is set to the standard surface pressure at sea level (29.92 inches of mercury at 15° C.). The second type of measurement is the indicated altitude. This is the altitude read from an altimeter referenced to a pressure different from the standard surface pressure, sometimes called a non-standard pressure. The latter varies in accordance with changes in temperature from the temperature at which a standard pressure for a given altitude is computed and changes in the pressure of the environment from the standard surface pressure.

Substantially all altimeters are provided with some arrangement for adjustment for operation at non-standard reference pressures. This is necessary since aircraft often operate in environments where the actual measured barometric pressure at an altitude differs from the standard pressure at that altitude. This is primarily due to a change in the temperature from that used (15° C.) to compute the standard surface pressure. For example, if altimeters were tied inflexibly to the standard atmospheric pressure-altitude relationship, they would all indicate 1,000 feet in altitude whenever they sensed a pressure of 28.86 inches of mercury. If 28.86 inches of mercury were the present actual surface pressure at an airfield with an actual elevation of 500 feet above sea level, then the altimeters of all aircraft on the runway of this airfield would be reading 1000 feet, giving a 500 feet error. This result would be dangerous since aircraft attempting instrument approaches actually would be flying 500 feet lower than their altimeters indicated if they were set to operate on the standard surface pressure. Hence, the need can be seen for operating an altimeter at some reference pressure other than the standard surface pressure in appropriate cases where the aircraft is flying over terrain whose surface pressure is non-standard.

Since all aircraft operate in a number of environments having different actual surface pressures which are seldom the standard surface pressure, these surface pressures varying from the standard surface pressure for a given terrain actual altitude and temperature, some mechanism is needed for readily setting a non-standard reference pressure into the altimeter. This non-standard reference pressure usually corresponds to the actual pressure of the terrain surface over which the aircraft is to fly, this pressure being measured by some means different from the altimeter. Once this reference pressure is set into the altimeter, it sets the pressure level about which altitude measurements are made by the altimeter.

In many cases, the mechanism for setting the reference pressure into the altimeter is a barometric setting knob which affects the relationship between the barometric pressure sensing elements and the altimeter indicator. The latter comprises one or more pointers moved by the pressure sensing element as the aircraft changes its altitude. In the usual case of setting in the reference pressure, a pilot flying an aircraft from a given airport obtains the airport's altimeter pressure setting, the actual measured barometric pressure of the airport, from its control tower. This altimeter pressure is set into the altimeter by turning the barometer setting knob and the pressure is usually displayed on the altimeter dial as a reading in inches of mercury. After this is done, the pilot compares the altitude indicated on his altimeter with the actual altitude of the aircraft above sea level. If there is any error, the barometer setting knob is turned until the altimeter reads the actual altitude of the airfield. The difference is taken between the new altimeter pressure setting and the one given by the control tower and used as a correcting factor.

In some cases, aircraft flying on a predetermined flight path are required to maintain the same altimeter pressure setting so that all aircraft may measure their altitude referenced to this setting. Where aircraft are operating with radio navigation systems, in which a base station is used to keep track of the altitudes of various aircraft operating with it, the aircraft sometimes are also required to report their altitudes back to the base station, based upon the same reference pressure. In many cases, the reference pressure selected is the standard surface pressure of 29.92 inches of mercury, although it could be some other pressure.

If an aircraft is to make altitude measurements at some predetermined reference pressure, say the standard surface pressure, then some provision must be made to also permit it to make altitude measurements at non-standard surface pressures which more likely correspond to the environment over which the aircraft is flying. This can be done by providing two altimeters, one of which is set to the standard surface pressure and the other to the actual surface pressure, or by alternately switching the altimeter pressure settings on a single altimeter between standard and non-standard pressure. The former arrangement increases the instrumentation needed on the aircraft with a consequent increase in space, weight and power requirements, while the latter gives rise to a source of error in possible mis-setting of the altitude pressure adjust knob and absence of one altitude indication while the other is being determined. It therefore becomes desirable to provide a single altimeter capable of producing data or indications of the two altitude measurements at the same time, thereby greatly simplifying an aircraft's instrumentation.

The present invention relates to an altimeter capable of producing electrical data signals corresponding to the altitude of the aircraft measured with respect to a first predetermined reference pressure, for example the standard surface pressure of 29.92 inches of mercury, while at the same time producing an altitude indication for any barometric setting provided by the barometer setting knob which may be the standard surface pressure or a non-standard pressure. The electrical data signals may be transmitted to another station, such as another aircraft or ground station, or used to operate a slaved remote altimeter on the same aircraft.

In accordance with the invention, an altimeter of the type having an adjustable barometric setting member is utilized in which the indicator pointers of the altimeter are moved by dimensional changes in the altimeter's pressure-sensitive element to display the measured altitude referenced to the pre-set altimeter barometric pressure. The pressure-sensitive member is also connected to operate an electrical system controlling a circuit for producing at the same time electrical signals corresponding to the altitude of the aircraft referenced to the standard surface pressure or to some other pressure. Thus, the altimeter can display the indicated altitude in accordance with any non-standard surface pressure setting, while simultaneously producing electrical signals corresponding to the pressure altitude measured by the altimeter with respect to the standard surface pressure.

The electrical system of the present invention is connected so that any changes in the altimeter pressure setting caused by rotating the barometric setting knob still leaves the means for producing the electrical signals referenced to the standard surface pressure or to some other predetermined reference pressure. This is accomplished by the use of a system in which an electrically variable element is used to produce the same electrical reference signal corresponding to the desired predetermined reference pressure, irrespective of any changes in the altimeter pressure setting from this pressure by the adjusting knob.

In the present invention, the barometric pressure setting knob is used to adjust not only the response of the pressure sensitive element about some reference pressure but also to move at the same time one of the rotor or stator elements of a synchro device. The pressure sensitive element is connected to move the other of the elements of the synchro so that the synchro produces an electrical signal corresponding to the altitude of the aircraft. This output signal corresponds to the difference in electrical position between the rotor and stator of the synchro. Since one of the elements is moved by the pressure setting knob, the difference can be referenced to any output signal or angular position of the rotor with respect to the stator, thereby referencing the output signal to some predetermined pressure setting.

In a preferred embodiment of the invention, the analog electrical signal produced by the synchro in response to movement of the pressure-sensitive element of the altimeter, and corresponding to the pressure altitude, is converted into digital, output signals by a digitizer and the digital signals are transmitted to a base station to indicate the pressure altitude of the aircraft. The altimeter of the present invention also includes an arrangement to adjust the altitude indicator pointers, to set in various altitude corrections, without disturbing the altimeter barometric setting or causing any change in the electrical reference for the standard surface pressure used to measure the pressure altitude.

It is therefore an object of the present invention to provide an altimeter for producing electrical data corresponding to the altitude of the aircraft measured with respect to a predetermined altimeter pressure.

A further object is to provide an altimeter for producing data referenced to the standard surface pressure while at the same time indicating the altitude of the aircraft measured with respect to a non-standard pressure.

Still a further object is to provide an altimeter in which the pressure sensitive member operates an electrical system, this system in turn controlling apparatus for producing digital signals corresponding to the pressure altitude of the aircraft irrespective of any non-standard pressure correction applied to the altimeter.

Yet another object is to provide an altimeter in which the pressure sensitive member operates apparatus for producing electrical signals corresponding to the pressure altitude of the aircraft while at the same time operating the altimeter pointer to indicate the altitude of the aircraft measured with respect to a non-standard surface pressure.

An additional object is to provide an altimeter in which electrical signals are produced corresponding to a measured altitude of an aircraft with respect to a predetermined reference pressure while indicating the altitude measured with respect to another pressure.

Other objects and advantages of the present invention will become more apparent upon reference to the following specification and annexed drawings in which:

FIGURES 1 and 2 are perspective views, partially in diagrammatic form, of two different embodiments of altimeters made in accordance with the invention; and FIGURE 3 is a schematic wiring diagram of the electrical components for the altimeter of FIGURE 2.

Referring ot FIGURE 1, the altimeter 10 is housed in a casing, shown in dotted outline form, and has a dial 12 on which suitable indicia (not shown) indicating various altitudes in terms of feet, or any other convenient units of measurement, are placed. The altimeter shown is of the so-called three-pointer display type having an inner pointer 14 for indicating altitude in units of ten thousand feet, a middle pointer 16 for indicating altitude in units of one thousand feet, and an outer pointer 18 for indicating altitude in units of one hundred feet. Changes in the dimensions of a pressure sensing element in accordance with changes in aircraft altitude rotates the outer pointer 18. All three pointers have concentric shafts and a suitable gearing arrangement (not shown) to rotate pointer 16 at one-tenth the rate of pointer 18 and pointer 14 at one-tenth the rate of pointer 16. Such arrangements are conventional and no further description is necessary. While a three pointer display is described, the present invention may be used with any other type of display, the details of which are relatively unimportant to the operation of the invention.

The dial 12 also has window 20 for displaying the barometric setting of the altimeter on a digital type meter 22 called the barometer counter. Of course, a continuous display type meter may also be used instead of the digital meter. Barometer counter 22, is moved by a barometer setting knob 24 extending outside of the altimeter casing, this knob 24 located on a shaft 26 on which gears 27 and 28 are mounted. The counter 22 is driven by gear 27 through an idler gear 31, a spur gear 32 and a set of bevel gears 34, one of which is connected directly to the counter and the other of which is mounted on a shaft 30. Counter 22 is provided with a suitable gearing mechanism (not shown) to produce a digital display, calibrated in terms of inches and hundredths of inches of mercury, for displaying the altimeter reference pressure.

Gear 28 on barometer setting shaft 26 drives a main gear 40 through an idler 42. Main gear 40 serves as a base for a portion of the altimeter and carries a bracket 47 to which one end of each of two altitude sensing wafers 44 and 45 are fixedly mounted. The wafers 44 and 45 are evacuated non-linear diaphragm type capsules whose physical dimensions expand or contract correspondingly to changes in pressure external to the aircraft. The external pressure is usually supplied through a pitot tube or other similar device on the aircraft. The free ends of each of the wafers 44 and 45 are connected respectively rocking shafts 48 and 49 through rocker arm linkages pivoted at both ends thereof. Only the linkage 50 for shaft 48 is shown but the other linkage for shaft 49 is the same. A temperature calibration member 52, in the form of a bi-metallic connecting piece, is provided on each of the linkages. Member 52 is adjusted by a suitable device 52a to set the calibration of the altimeter for various temperature conditions.

Each of the rocking shafts 48 and 49 is pivotably mounted at one end thereof to the gear 40. The other end of each shaft is fixedly pinned to corresponding sector pieces 54 and 55. Each of the sector pieces has a respective cross-arm 54a and 55a, these arms being parallel to each other. The sectors are linked together in parallel by a cross-link piece 57 pivotally mounted to each cross-arm. An anti-backlash spring 58 is also provided between the cross-arms of the two sector pieces. Sector 54 serves as a balancing weight while sector 55 has a toothed arucate portion which drives an output shaft 60 through a pinion gear 61.

The angular rotational motion of the pinion gear 61 and shaft 60, which corresponds to the dimensional changes of wafers 44 and 45 in accordance with the pressure they measure, is amplified through a gear train formed by a gear 62 on shaft 60, gears 63 and 67 on the ends of a shaft 65, and a gear 68 on the pointer shaft 19. This shaft directly drives the three pointers 14, 16 and 18. In operation, a pressure sensed by the two capsules or wafers 44 and 45 causes a change in their physical dimensions which drives the respective rocking shafts 48 and 49 in parallel through cross-piece 57. This rotates sector 55 and the drive pinion gear 61 and in turn rotates the three pointers 14, 16 and 18 in accordance with the pressure sensed by the two capsules 44 and 45. The altitude of the aircraft corresponding to pressure measured is displayed on dial 12.

Turning the barometer setting knob 24 to set in a reference pressure also turns the main gear 40 on which the capsules 44 and 45 are mounted. This rotates the entire capsule assembly including the sector gear 55 and therefore the shaft 19 and pointer 18. This provides a fixed altitude reference reading on the dial 12 corresponding to the reference pressure set in by knob 24, and any changes in dimension of the capsules 44 and 45 cause the reading to vary about this reference.

As pointed out previously, it is sometimes desirable to be able to produce data corresponding to altitude measurements referenced to some predetermined reference pressure such as the standard surface barometric pressure of 29.92 inches of mercury. The present invention accomplishes this by the use of an analog to digital converter 75 provided. Converter 75, also called a digitizer, may be of any suitable type. In general, converters of this type, which are well known in the art, have a brush assembly and a commutator assembly. These assemblies are movable with respect to each other, and one of them is mounted on a movable input member. The arrangement of the brushes and commutators are such that movement of the input member, on analog function, causes the brushes and commutators to be so located with respect to each other to produce a digital output signal corresponding to the angular position of the input member. This digital signal is usually produced on a number of output lines (indicated schematically), there being one digital bit per line.

Referring to FIG. 1, the converter 75 has a movable input member in the form of disc 76 which is rotated by a gear 77 and an outer movable member 79 rotatable through a gear 80. An anti-backlash spring 81 is connected to gear 77 through a shaft 82. Member 79 carries the brush assembly for the converter while member 76 carries the commutator assembly. A digital output signal is produced by converter 75 in accordance with the difference in angular position between members 76 and 79. Production of the digital signal is accomplished in the converter 75 in accordance with any desired code, and the brushes and commutators can be set to produce any desired digital output signal for a predetermined angular difference between the two members 76 and 79.

Input member 76 of the converter is driven through gear 77 and the pinion gear 68 on the pointer shaft 19. Thus, member 76 is rotated in accordance with the altitude measured by wafers 44 and 45. As explained previously, the angular position of the member 76 with respect to member 79 determines the digital output signal of the converter 75. This is related to the altitude measured by the altimeter 10 and, if member 79 of the converter is kept stationary, the digital output signal corresponds to the measured altitude referenced to any pressure set in by the barometric setting knob 24.

Of course, any other suitable converter may be utilized, such as, for example, a non-contacting optical, infrared or magnetic converter, or any other type of digitizer.

One of the objects of the present invention is to produce altitude data referenced to the standard surface pressure of 29.92 inches of mercury, or to some other predetermined reference pressure, irrespective of the setting of the pressure into the altimeter made through knob 24 and the altitude display of dial 12. This data is produced in the present invention by the converter 75. Accordingly, an arrangement is provided to rotate member 79 of the converter 75 as knob 24 is turned, to keep the output of the converter always referenced to this standard pressure.

To explain this, consider that the knob 24 is turned to set a pressure of 29.92 in window 20. If the aircraft is at 1000 ft., the pressure measured is 28.86 inches of mercury, and the pointers indicate 1000 ft. on dial 12. At the same time, converter 75 produces digital output signals corresponding to 1000 ft. because member 76 is rotated an amount corresponding to 1000 ft. through pointer shaft 19. If the pilot now sets a knob 24 to a reference pressure of 28.86 inches of mercury and the aircraft is on a runway of 1000 ft. elevation, then the pointers for dial 12 should indicate zero feet since there is no difference between the reference pressure of knob 24 and the actual pressure measured by wafers 44 and 45. Therefore, since the pointers do not rotate from zero position, member 76 of the converter is also not rotated. If no provision is made to move member 79 of the converter, then its output signal would also indicate zero feet. However, since it is desired to reference the output of converter 75 to the standard surface pressure, member 79 can be moved an amount corresponding to the rotation of knob 24 so that its position with respect to the unmoved input member 76 is that needed to produce an elecrical signal corresponding to the pressure altitude of 1000 feet.

To accomplish this, converter member 79 is moved by the barometer setting knob 24 and shaft 26 through a differential 85, differential pinion output gear 97, gear 86 and pinion 87, and a ratio gear train formed by gears 89 and 90, idler gear 91 and gear 93 which drives the gear 80 of converter member 79. The ratio gear train provides the proper angular rotation for converter member 79 corresponding to the difference in the setting of reference pressure by knob 24 and the standard surface pressure.

Differential 85 is provided to compensate for the departure from a straight line funtcion of the pressure versus altitude relationship. This differential includes a spider gear driven by a linkage arm 95 pivotally connected to idler gear 91. The other input to the differential is from shaft 30 and the differential output is the spur gear 97. Gear 97 meshes with spur gear 86 fixed on shaft 32a to which the pinion driver gear 87 is attached. The operation of the linkage arm on the spider either aids or retards the rotation of pinion gear 87 by acting on the gear 86 through the differential output gear 97. Differential 85 keeps the output of converter 75 linear in response to substantially linear altitude input changes to converter member 76 produced by changes in dimensions of wafers 44 and 45. The latter are originally made non-linear to compensate for the non-linear pressure versus altitude function.

As can be seen, no matter what the setting of the barometric knob 24 by the pilot of the aircraft, to adjust for any non-standard surface pressure conditions, the converter 75 is always reference to the standard surface pressure so that signals produced thereby represent altitude (pressure altitude) referenced to this same standard pressure. In the meantime, the indicator 12 of the altimeter reads the actual altitude of the aircraft in accordance with any barometric compensation set in by knob 24.

While the twin capsules 44 and 45 produce adequate output torque to directly drive input member 76 of the converter 75, it may be desirable to reduce the input torque required by using a servo system to drive the converter, thereby further increasing the altimeter's accuracy in reporting data referenced to the standard surface pressure. FIGURE 2 shows another embodiment of the invention in which a different arrangement is utilized for driving the converter input to produce the digital electrical signal. This arrangement utilizes two small transmitting synchros 110, 114 to produce a signal corresponding to the measured altitude referenced to the standard surface pressure. This signal is used to drive member 76 of the converter through a pair of receiving synchros 130, 134 which control a motor 142 connected to input member 76.

In FIGURE 2, the majority of components for measuring and displaying altitude are the same as those in FIG. 1 so that the same reference numerals are used where applicable. The dial 12 is the same with the exception of an additional window 102 for displaying information from a warning flag indicator 104 for showing that the altimeter is operative.

Instead of directly driving the input member 76 of converter 75, as in FIG. 1, pinion gear 68 on pointer shaft 19 drives the rotor of a first synchro transmitter 110 through a gear 112. The rotor of a second synchro transmitter 114 is driven through a gear ratio reducing train formed by gears 116 and 118. The latter gear has an anti-backlash spring 120. Synchros 110 and 114 are respectively "fine" and "coarse" transmitting synchros of a conventional two-speed system. These two synchros are preferably Syntrols, which are manufactured by the assignee hereof. These have an extremely low torque input requirement for the rotor and also have no output brushes. Of course, any suitable synchro may be used. The ratio of gears 112, 116 and 118 is such that the rotor of synchro 114 rotates considerably less than the rotor of synchro 110 for any change in altitude referenced to the pressure set in by knob 24. The actual ratio may be, for example, 27.1:1 with the rotor of synchro 110 geared to turn 360° for each 5000 feet of altitude. Of course, other ratios can be used, as desired.

The stators of synchros 110 and 114 have respective gears 120 and 124 which are geared together by a reducing gear 126. The larger diameter portion of gear 126 mating with gear 127 and the gear 124 are of the anti-backlash type. The stators of both synchros are turned, in the same gear ratio as the rotors, by gears 91 and 93 which are rotated by the barometer setting knob 24 and the differential 85. The output of the synchros is referenced to the standard reference pressure irrespective of the setting of knob 24, just as the output of converter 75 of FIG. 1 was so referenced.

The stators of synchros 110 and 114 are connected back to back with the stators of a corresponding pair of fine and coarse receiving synchros 130 and 134 located in a data module 135. Thus, the rotors of synchros 130 and 134 produce an error voltage corresponding to the difference in rotor positions between the transmitting and receiving synchro pairs. Module 135 may be either remotely located with respect to the altimeter or directly connected thereto. In the latter case, either directly connected wires may be used or connecting plugs provided between the altimeter 10 and module 135 to facilitate removal and servicing.

As shown best in FIG. 3, the rotors of synchros 110 and 114, which are rotated by a change in dimension of capsules 44 and 45, are connected in parallel to an A.C. supply. The gear reducing train is not shown. The stator windings of the two synchros are connected to corresponding stator windings of receiving synchros 130 and 134 whose rotors are the inputs to an error sensing amplifier 140. This amplifier is preferably formed of thin film or micro-circuits to conserve space, reduce heat and increase reliability. Any difference in the angular positions of the corresponding rotors of the fine and coarse transmitting and receiving synchros, caused by a change in altitude which turns the rotors of synchros 110 and 114, produces a voltage at the rotors of the synchros 130 and 134. This error voltage appears at the output of amplifier 140 and is used to drive the output shaft 143 of a motor 142 in one direction or the other. Output shaft 143 repositions the rotors of synchros 130 and 134 to reduce the error voltage to zero. At the same time it drives an A.C. generator 145 used for producing a speed feedback signal which increases the stability of the servo system and prevents hunting of the motor.

Output shaft 143 also turns the movable input member 76 of digitizer converter 75 through gear train 150, so that the code output of the converter is changed in accordance with the original rotation of the rotors of synchros 110 and 114 in response to the altitude. The stators of these two synchros are rotated by the knob 24 to preserve an angular difference between rotors and stators to reference their output signals to the standard surface pressure.

Referring back to FIG. 2, the motor and generator 142 and 145 are in one unit from which a generator feedback signal line runs to amplifier 140. The geared motor output shaft 143 drives the rotor of the fine receiver synchro 130 and the input 76 of the converter 75 through a gear train 150 having an output spur gear 152. Gear 152 meshes with a synchro input gear 154 and a converter input gear 156, both of which are of the anti-backlash type. The rotor of coarse receiver synchro 134 is driven by gear 154 through a train of reduction gears 158–161, with gears 158, 159 and 161 being of the anti-backlash type. The stators of both synchros 130 and 134 are fixed.

As in FIG. 1, the converter 75 produces a digital output of the altitude referenced to the standard surface pressure. Of course, some other reference pressure may be selected. Also, other types of output signals may be produced instead of the digital output signals, for example, amplitude, pulse, frequency or phase modulated signals. Any of these signals can be transmitted from the aircraft in a conventional manner.

The receiver synchros may also be used to operate another pair of synchros (not shown) to drive a remote slaved altimeter. The fine and coarse synchros for the remote altimeter would have their rotors geared to the fine and coarse synchro receivers in a 1:1 relationship. The rotors of these two synchros would also be repositioned by a shaft analogous to the motor shaft 143.

Each of the altimeters 10 of FIGS. 1 and 2 also has provision for resetting the pointers without disturbing the barometric pressure adjustment of knob 24 or the relationship of the electrical devices for producing the signal referenced to the standard surface pressure. This is accomplished by pulling knob 24 and shaft 26 forward and disengaging gears 27 and 31. Rotation of knob 24 moves main gear 40 through gear 42 and resets the pointers through shaft 19. The barometer counter 22 and member 79 of converter 75 (FIG. 1) or the stators of synchros 110 and 114 (FIG. 2) are not turned. This provides a convenient adjustment for the pointers. If desired, a lock (not shown) may be placed on the knob 24 to prevent it from being pulled out.

While preferred embodiments of the invention have been described above, it will be understood that these are illustrative only, and the invention is limited solely by the appended claims.

What is claimed is:
1. A barometric altimeter comprising:
    means for measuring barometric pressure and producing a dimensional change in response thereto,
    means for setting a first reference pressure into the altimeter about which the measuring means measures the barometric pressure,
    means responsive to a dimensional change of the pressure measuring means for indicating altitude referenced to said first reference pressure,
    and means for electrically indicating altitude referenced to a predetermined reference pressure including:
        (a) first input means movable to a first position in response to said first reference pressure set into the altimeter by said setting means, (b) second input means movable to a second position in response to the dimensional change of the pressure measuring means, and (c) means for producing an electrical signal responsive to the locations of said first and second positions corresponding to the altitude referenced to said predetermined reference pressure.

2. A barometric altimeter as set forth in claim 1 wherein said electrical signal producing means is an analog to digital converter for producing digital output signals.

3. A barometric altimeter as set forth in claim 1 wherein means are provided for disconnecting said pressure setting means from the first mentioned altitude indicating means to permit adjustment thereof without effectively changing said first reference pressure.

4. A barometric altimeter comprising:
means for measuring barometric pressure and producing a dimensional change in response thereto,
means for setting a first reference pressure into the altimeter about which the measuring means measures the barometric pressure,
means responsive to a dimensional change of the pressure measuring means for indicating altitude referenced to said first reference pressure,
electrical control means for producing an electrical signal indicating altitude referenced to a predetermined reference pressure, said control means including first and second elements movable with respect to each other for producing an electrical signal corresponding to a positional difference therebetween,
means connecting the pressure measuring means to one of said elements to move the same in accordance with changes in dimension thereof,
and means connected to the other of said elements and said reference pressure setting means to move said other element as the said setting means changes the first reference pressure from the predetermined reference pressure to produce a predetermined positional relationship between said elements.

5. A barometric altimeter as set forth in claim 4 wherein said electrical control means is an analog to digital converter for producing a digital output corresponding to the positional difference between said first and second elements.

6. A barometric altimeter as set forth in claim 4 wherein said electrical control means comprises synchro means for producing an electrical analog signal corresponding to the positional difference between said first and second elements.

7. A barometric altimeter comprising:
means for measuring barometric pressure and producing a dimensional change in response thereto,
means for setting a first reference pressure into the altimeter about which the measuring means measures the barometric pressure,
means responsive to a dimensional change of the pressure measuring means for indicating altitude referenced to said first reference pressure,
electrical control means for porducing an electrical signal indicating altitude referenced to a predetermined reference pressure, said control means including first and second elements movable with respect to each other for producing an electrical signal corresponding to a positional difference therebetween,
means connecting the pressure measuring means to one of said elements to move the same in accordance with changes in dimension thereof,
means connected to the other of said elements and said reference pressure setting means to move said other element as the said setting means changes the first reference pressure from the predetermined reference pressure to produce a predetermined positional relationship between said elements,
and differential means connected between said other of said elements and said reference pressure setting means to modify the movement of said other means in a predetermined manner.

8. A barometric altimeter comprising:
means for measuring barometric pressure and producing a dimensional change in response thereto,
means for setting a first reference pressure into the altimeter about which the measuring means measures the barometric pressure,
means responsive to a dimensional change of the pressure measuring means for indicating altitude referenced to said first reference pressure,
electrical control means for producing an electrical signal indicating altitude referenced to a predetermined reference pressure, said control means including first and second synchro means each having first and second elements rotatable with respect to each other for producing an electrical signal corresponding to a positional difference therebetween,
means connecting the pressure measuring means to one of said elements of each synchro to rotate the same in accordance with dimensional changes of the pressure measuring means,
and means connected to the other of said elements of each of said synchro means and to said reference pressure setting means to rotate each of said other elements as said setting means changes the first reference pressure from the predetermined reference pressure to produce a predetermined positional relationship between said elements.

9. A barometric altimeter as set forth in claim 8 and further comprising differential means connected between said other of said elements and said reference pressure setting means to modify the rotation of both of said other means.

10. A barometric altimeter comprising:
means for measuring barometric pressure and producing a dimensional change in response thereto,
means for setting a reference pressure into the altimeter about which said measuring means measures the pressure,
mechanical readout means responsive to a dimensional change of the pressure measuring means and to the reference pressure for indicating the pressure measured,
and means for producing an electrical signal proportional to said dimensional change of said pressure measuring means referenced to a second reference pressure.

11. The barometric altimeter of claim 10, wherein said electric signal producing means includes means for producing a digitized electrical signal.

References Cited

UNITED STATES PATENTS

| 3,009,358 | 11/1961 | Angus | 73—384 |
|---|---|---|---|
| 3,083,575 | 4/1963 | Frohardt | 73—384 |

FOREIGN PATENTS

| 936,595 | 9/1963 | Great Britain. |
|---|---|---|

LOUIS R. PRINCE, *Primary Examiner.*

D. O. WOODIEL, *Assistant Examiner.*

Disclaimer 3,353,408.—*Frank G. Daleo*, Armonk, N.Y. ALTIMETER FOR PRODUCING DATA REFERENCED TO A PREDETERMINED PRESSURE. Patent dated Nov. 21, 1967. Disclaimer filed Oct. 22 1968, by the assignee, *Lear Siegler, Inc.*

Hereby enters this disclaimer to claims 7 and 9 of said patent.

[*Official Gazette March 18, 1969.*]